United States Patent
Li et al.

(10) Patent No.: US 7,477,047 B2
(45) Date of Patent: Jan. 13, 2009

(54) REGISTER WITH DEFAULT CONTROL AND BUILT-IN LEVEL SHIFTER

(75) Inventors: Ning Li, Freemont, CA (US); Tom W. Kwan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 442 days.

(21) Appl. No.: 11/284,199

(22) Filed: Nov. 21, 2005

(65) Prior Publication Data

US 2007/0114984 A1 May 24, 2007

(51) Int. Cl.
G05F 1/40 (2006.01)
(52) U.S. Cl. .................. 323/283; 323/901; 363/49
(58) Field of Classification Search ............ 363/49; 323/282, 283, 284, 285, 901, 908; 375/238
See application file for complete search history.

(56) References Cited

U.S. PATENT DOCUMENTS

| | | | |
|---|---|---|---|
| 6,400,127 B1 * | 6/2002 | Giannopoulos | 323/283 |
| 7,057,379 B2 * | 6/2006 | Chapuis | 323/283 |
| 7,177,166 B1 * | 2/2007 | Kris | 323/282 |
| 7,180,757 B2 * | 2/2007 | Chen et al. | 363/49 |
| 7,417,877 B2 * | 8/2008 | Leung et al. | 323/283 |

* cited by examiner

*Primary Examiner*—Jessica Han
(74) *Attorney, Agent, or Firm*—Garlick Harrison & Markison; Bruce E. Garlick (57) ABSTRACT

Embodiment of the present invention may provide a switching regulator which may be located within an IC. The switching regulator couples to an external power supply, a plurality of configurable control registers, a plurality of default registers, and a multiplexer. The multiplexer is operable to select an input control signal from either the plurality of configurable control registers or the plurality of default control registers as the output control signal to the switching regulator. This default control signal, although not optimal, allows the switching regulator to be configured in a default condition during start up or power down operations and ensures that the switching regulator may provide a stable, although not necessarily optimal, power output to the various components within the IC.

11 Claims, 7 Drawing Sheets

Prior Art

FIG. 1

Prior Art

REGISTER WITH DEFAULT CONTROL AND BUILT-IN LEVEL SHIFTER

TECHNICAL FIELD OF THE INVENTION

The present invention relates generally to the integrated circuits (IC), and more particularly to the distribution of power and signals to an IC.

BACKGROUND OF THE INVENTION

Integrated circuits (IC) are increasing in complexity. The number of devices incorporated within a single IC is greatly increasing and causing the size and complexity of individual ICs to increase. As a result of increased component density and improved fabrication technology is the realization of system on chip (SoC) applications. In some advanced IC designs, the power supply is also integrated into the design. For an example, a switching regulator may be included to supply power to the IC. This switching regulator may be used to provide a stable power output to the various components of the IC.

Figure 1:
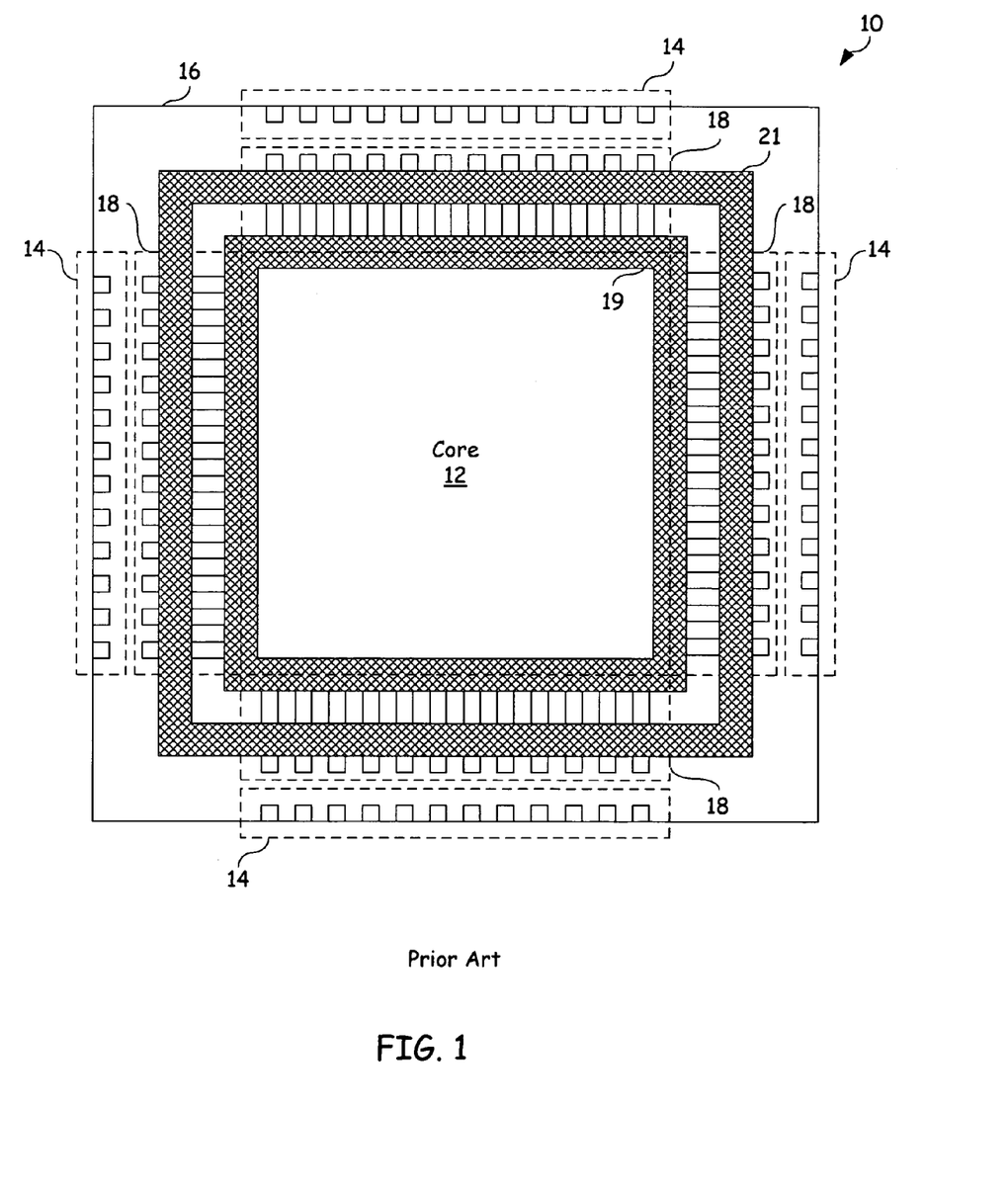
FIG. 1 provides a block diagram describing the architecture of a system on a chip (SoC) integrated circuit (IC)

FIG. 1 depicts such an IC or SoC 10 that may include many logic and memory functions within the SoC. For example, core 12, as further described in FIG. 2, may include a CPU core 20, DSP core 22, DSP book 24, memory 26, control circuitry 28, analog/mixed signal circuitry 30, and power or switching regulator 32. These are just examples of the types of systems or components that may be integrated into a single chip.

Complexities are associated with the realization of SoC designs. Incorporating diverse components previously contained within printed circuit board (PCB) involves confronting many design challenges. The discrete components may be designed for different entities using different tools. As such, they may have different power requirements. For example, not all components available in 5 volt design libraries may be available in lower voltage design libraries. This forces mixed power requirements within these highly integrated ICs. Other difficulties lie in fabrication. In general, fabrication processes of memory may differ significantly from those associated with logic circuits. For example, speed may be the priority associated with a logic circuit while current leakage of the stored charge is of priority for memory circuits. Therefore, multi-level interconnect schemes using five to six levels of metal are essential for logic ICs in order to offer improved speed, while memory circuits may need only two to three levels.

Figure 2:
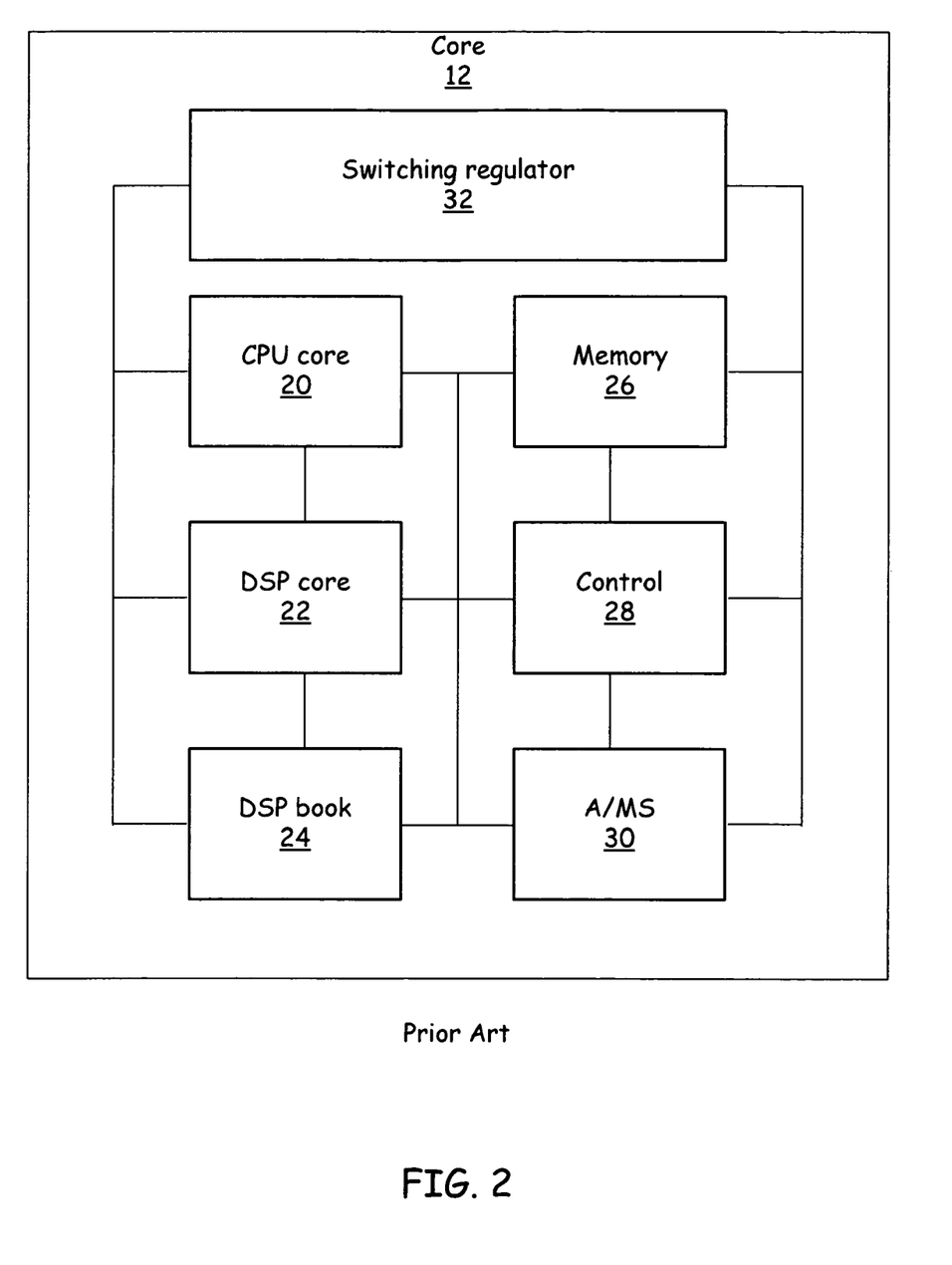
FIG. 2 provides a block diagram describing the macro processing circuits typically contained within the SoC of FIG. 1.

In order for these ICs to be useful, the individual modules within the IC must receive power. As previously stated, different circuits within these modules may require a number of different voltage potentials. For example, powering microcontrollers or logic circuits may require a different voltage than that required for memory, or for powering a string of LEDs. FIGS. 1 and 2 depict an IC that may contain a combination of circuits or modules that require different voltages. To minimize the number of inputs to the integrated circuit, a single input voltage may be delivered to the IC. Then, power regulators are required to produce the various voltages necessary to operate the various components within the IC. These power regulators may be an inductor based, switched mode power converter, a switch capacitor charge pump, or other type of known power regulator. Each regulator may have a particular advantage or disadvantage and the application for the IC may determine which type of power regulator is best suited to that IC and application.

Inductor based switch mode power converters, such as a boost switching regulator, linear regulator or buck switching regulator, may be used to provide regulated voltages that are greater than the input voltage source or less than the input voltage source, respectively. For example, a boost regulator may be used to produce an output voltage that is always greater than the input voltage. Similarly, a buck regulator may be used to produce an output voltage that is always less than the input voltage. Registers within the boost or buck switching regulator may be used to configure the function or output of the regulator. A problem exists during startup, in that the switching regulator, which has now been incorporated into the IC, lacks valid inputs from the control registers within the IC. These control registers are used to properly configure the switching regulator to ensure a stable power signal for the IC. Without this input, proper operation is not guaranteed during system start up as the processing modules used to supply control signals to the control registers require power. During normal operations, this power is supplied by the switching regulator. To ensure proper operation of the switching regulator and IC a better means of configuring the switching regulator is required.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Embodiments of the present invention provide a switching regulator for use within an integrated circuit (IC) (or chip) that substantially addresses the previously identified problems, as well as others. More particularly, embodiments of the present invention provide a switching regulator and a method of configuring a switching regulator that will ensure a stable power signal to the IC during startup, normal operations, power down operation and transient operations.

Embodiments of the present invention allow advanced IC designs, which may incorporate power supplies within the IC design, to provide a stable power output to the internal components of the IC during all phases of IC operation, i.e., startup, normal operations and power down operations. A switching regulator may be used to supply this stable power output to the IC wherein the processors within the IC may be operable to configure the mode of operation of the switching regulator. To ensure a stable power output during transient operations (i.e. startup and power down operations) the switching regulator is provided with a default control signal operable to configure the control registers and ensure a stable output even though the switching regulator may not be operating in an optimal mode. Following startup when a valid power signal and configurable control signal is produced within the IC, the switching regulator may be reconfigured based on the configurable control signal in order to provide a more optimal mode of operation of the switching regulator. This overcomes problems where the switching regulator was configured by a configurable control signal produced within the IC, wherein the configurable control signal is not always available during transient conditions like startup. When the configurable control signal was not available during startup, prior switching regulators may have operated in an unknown or unstable condition that yielded unstable results.

Figure 3:
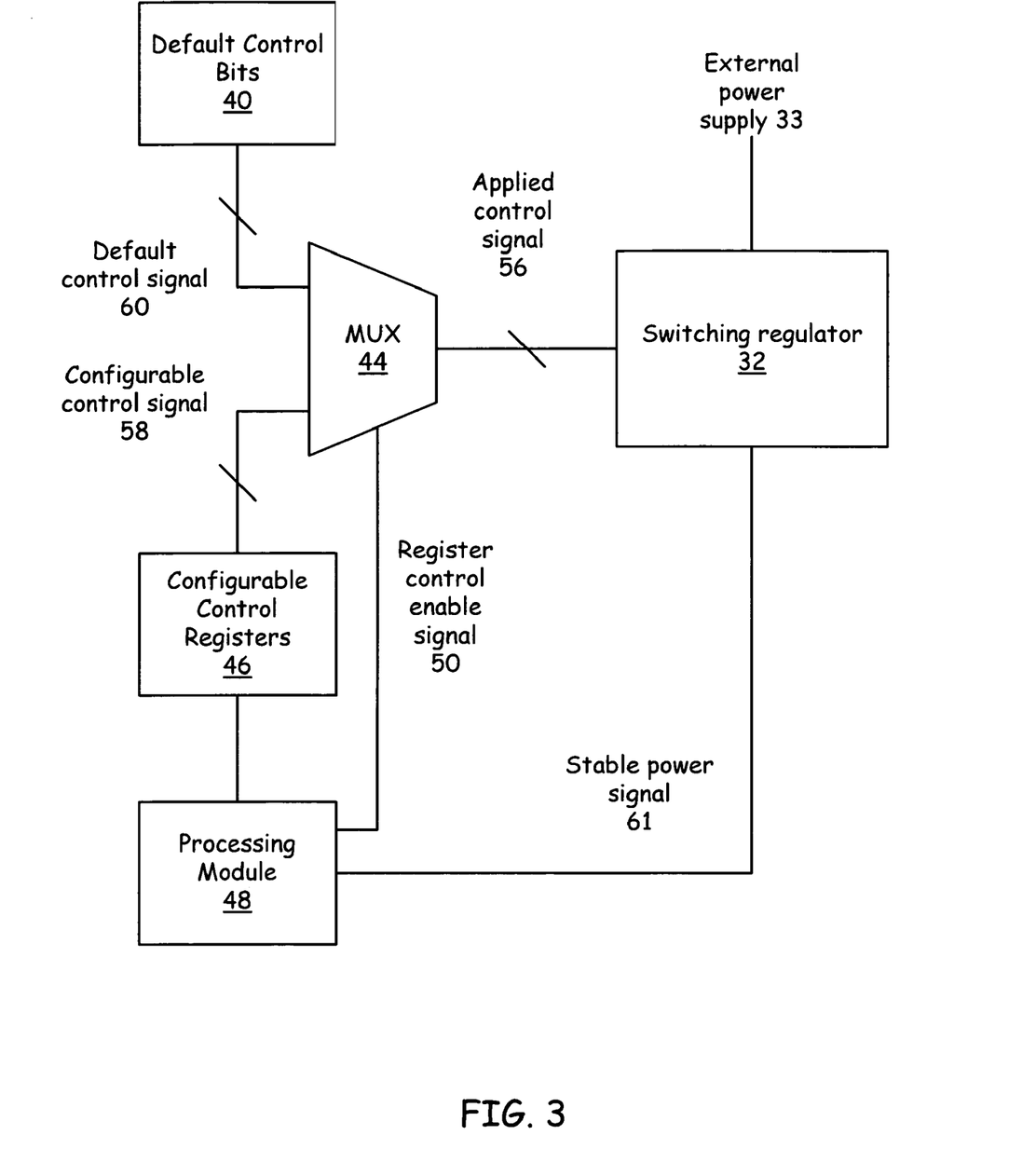
FIG. 3 provides a functional block diagram of a switching regulator in accordance with an embodiment of the present invention.

FIG. 3 provides a functional block diagram of one embodiment of the present invention. Within an IC, such as IC 10 discussed with reference to FIGS. 1 and 2, switching regulator 32 may be used to produce and distribute an internal power signal within the IC. To properly configure the switching regulator, the IC may include default control registers 40, configurable control registers 46, multiplexer (MUX) 44, and processing module 48. Switching regulator 32 couples to an external power supply such as a battery 33. This battery may supply a 1.5 volt, 3.3 volt, 5 volt or other like input signal to the switching regulator. The incorporation of switching regulator(s) within the IC allows a single voltage input to supply the various internal needs of the IC. Switching regulator 32 may be a boost switching regulator, a linear regulator switching regulator, a buck regulator, or other like switching regulator. This switching regulator is used to regulate voltages supplied to internal modules within the IC.

A single IC may have more than one switching regulator in order to provide the combination of circuits and processing modules contained within the IC their required voltages. The switching regulators allow the number of inputs to the IC to be reduced such that a single input voltage may be delivered to the IC and used to supply multiple input voltages to the components within the IC. Switching regulators offer the advantage of high power conversion efficiency and increased design flexibility. Switching Regulator 32 may be configured according to a control signal applied to the switching regulator by MUX 44. Applied control signal 56 may be a series of bits. MUX 44 is a multiple input digital device that can select from a number of inputs and pass the selected input signal as the output signal to the switching register. MUX 44 will select either a configurable control signal 58 from configurable control registers 46 or default control signal 60 from default control registers 40 as the output signal to be applied to switching regulator 32. During start up or when a register control enable signal 50 is not present, MUX 44 may select the default control signal to be applied to switching regulator 32. Once switching regulator 32 is powered up and provides a stable power output to processing module 48, the switching regulator can be reconfigured according to the specific needs of the IC.

The switching regulator may be configured in multiple modes of operation. For example, the switching regulator may operable better in a first configuration when high current loads exist and a second configuration when low current loads exist. The processing module is operable to identify the configuration best suited to the operation and loads placed on the switching regulator. Alternatively, the types of protection applied to the switching regulator may be adjusted depending on the mode of operation of the switching regulator. For example, over current protection may be desirable during start up or transient conditions, but may not be required during normal operation. The switching regulators functionality is improved by the ability to reconfigure the switching regulator for different applications. Thus, a single switching regulator design may be incorporated into a number of different ICs and hence products, without requiring a unique switching regulator for each application. The configurable control signal may be generated by the processing module and applied to the switching regulator to configure the switching regulator according to the existing conditions, load and application. Similarly, should the processing module identify a fault condition, the processing module may specify a "safe" mode of operation or the default mode of operation to ensure proper operation of the IC.

Figure 6:
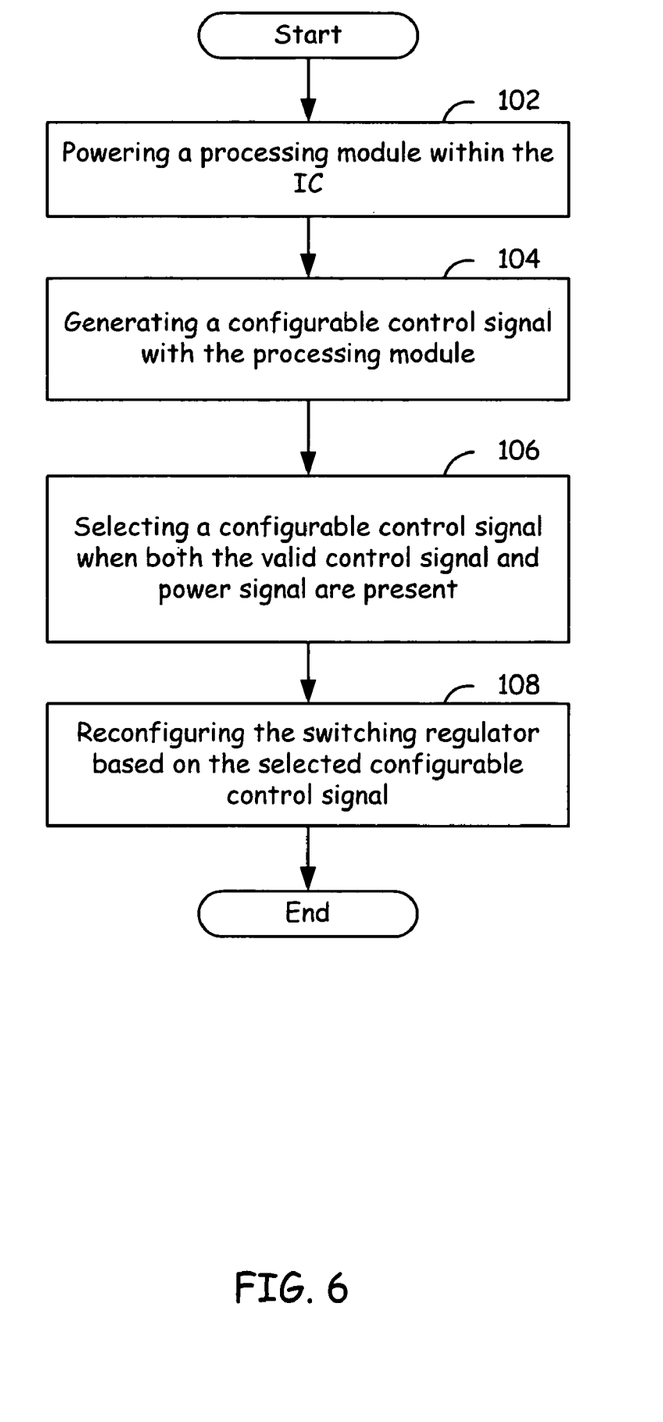
FIG. 6 provides a logic flow diagram in accordance with an embodiment of the present invention.
Figure 7:
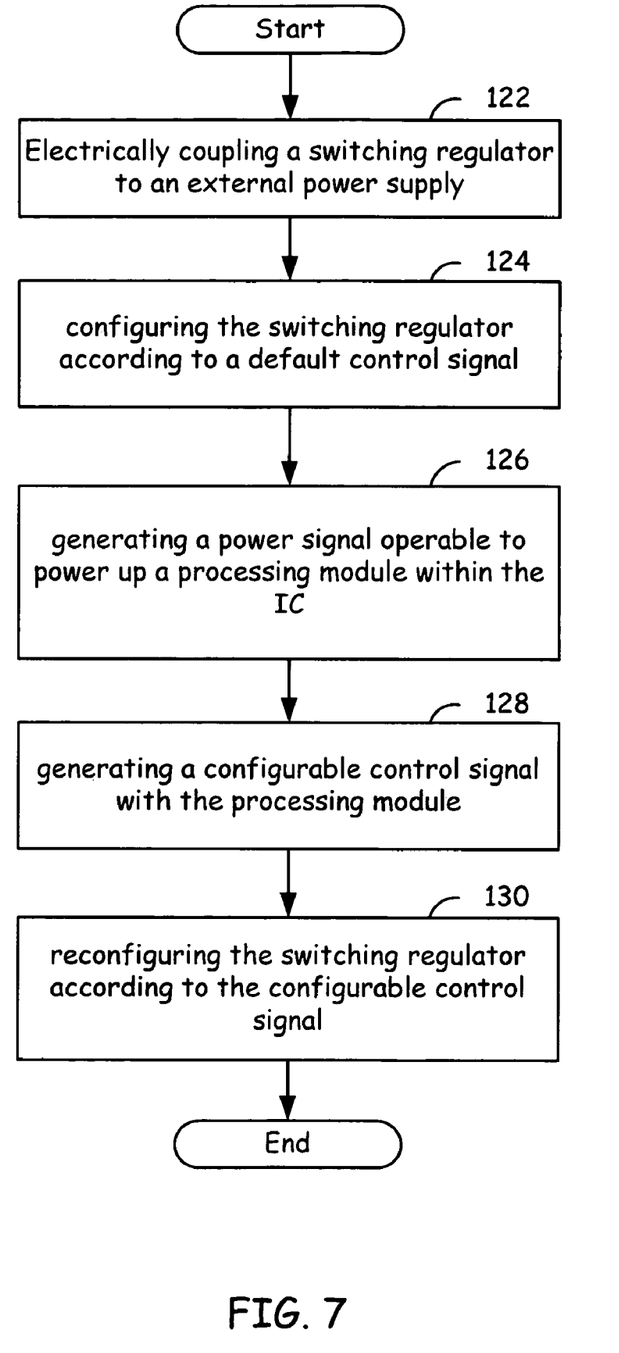
FIG. 7 provides a logic flow diagram illustrating a startup sequence in accordance with an embodiment of the present invention.

Processing module 48 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory available to processing module 18 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when processing module 48 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores and the processing module executes. Operational instructions corresponding to at least some of the steps and/or functions are illustrated in FIGS. 5, 6 and 7.

Processing module 48, once powered up, may generate configurable control signal 58 which is then stored in control registers 46. Register control enable signal 50 supplied to MUX 44 may be based on the presence of a valid configurable control signal from the processing module and the presence of an appropriate voltage output from the switching regulator. By requiring both an appropriate voltage output from the switching regulator and a valid configurable control signal from the processing module 48 prior to selecting the configurable control signal, embodiments of the present invention ensure that the switching regulator is not inadvertently or improperly configured based on an errant or invalid configurable control signals. By eliminating this possibility, switching regulator 32 provides a more stable output to the IC during transients like startup or power down events. The default control signal may not necessarily provide for an optimal configuration of the switching regulator. However, by initially configuring the switching regulator according to a default mode, a valid power signal 61 is ensured to provide for the proper operation of the processing module and other components of the IC. Following a proper power up, a configurable control signal, generated by the processing module, may be applied to the switching regulator in order to optimize the settings of the switching regulator 32.

Figure 4:
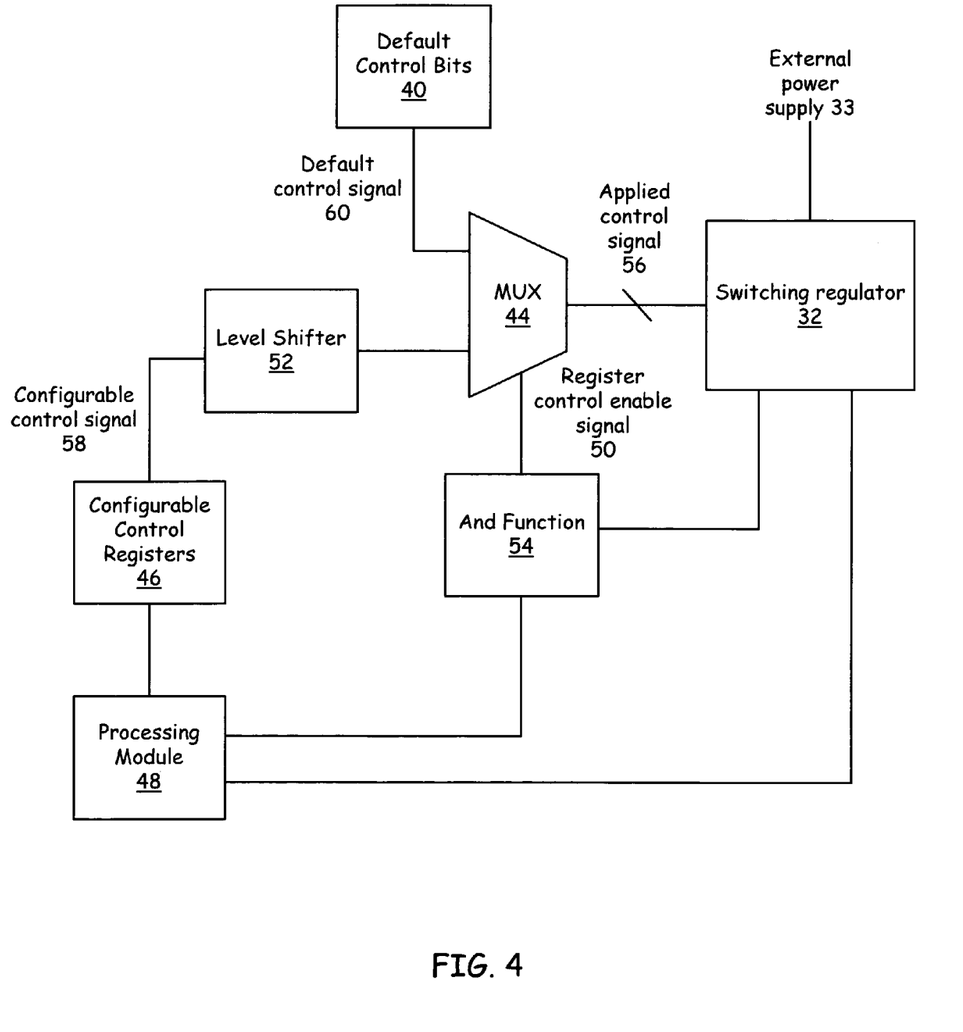
FIG. 4 provides a second functional block diagram of a switching regulator in accordance with an embodiment of the present invention.

FIG. 4 provides another configurable switching regulator within an IC in accordance with an embodiment of the present invention. Here, IC 10 includes switching regulator 32, MUX 44, default control register 40, configurable control registers 46, processing module 48, level shifter 52 and input selector module 54. This embodiment is similar to that discussed in FIG. 3 with the addition of a level shifter 52. Level shifter 52 allows the control voltage produced by processing module 48 to be shifted from a first voltage level to a second voltage level. For example, control signal 58, produced by processing module 48 and stored in configurable control registry 46, may be a 3.3 volt or 5 volt signal while switching regulator 52 may require a different voltage for the applied control signal. Level shifter 52 allows the higher voltage of the 3.3 or 5 volt configurable control signal produced by the processing module to be level shifted to a 1.5 volt configurable control signal. The level shifted configurable control signal may be selected and applied to switching regulator 32. By reducing the voltage required to be applied to the switching regulator, the leakage current may be reduced. Additionally, MUX 44 may receive an enable signal from input selector module 54. Input selector module 54 functions as an "and" gate that receives inputs that may describe the presence of a valid configurable control signal from the processing module and the presence of a valid power output from switching regulator 32. Input selector module 54 requires both of these inputs to be present prior to enabling the multiplexer to select the configurable control signal as the output to the switching regulator. This ensures that the multiplexer does not select the configurable control signal unless the IC is properly powered and functioning to produce a configurable control signal.

Figure 5:
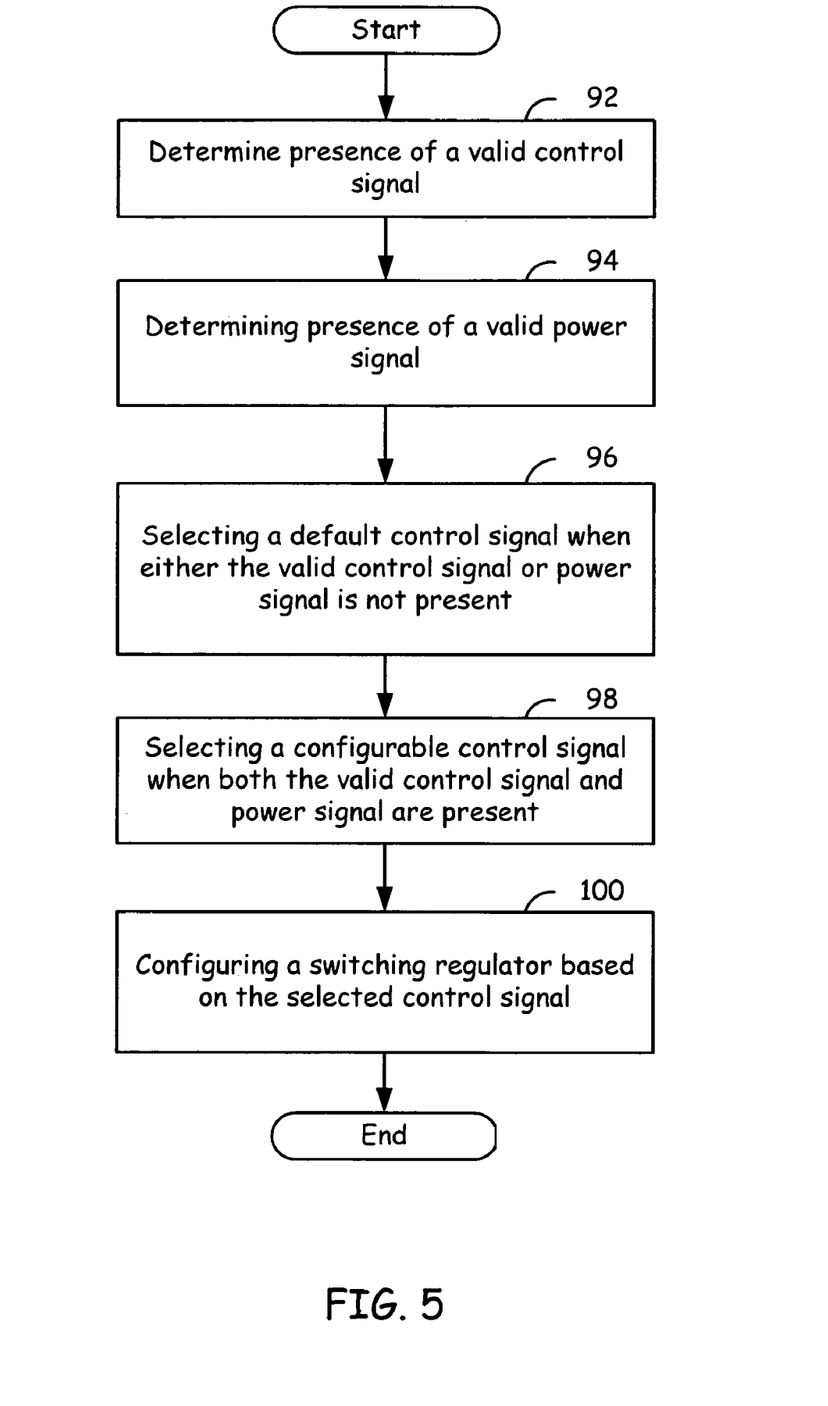
FIG. 5 provides a logic flow diagram in accordance with an embodiment of the present invention.

FIG. 5 provides a logic flow diagram of a method operable to configure a switching regulator in accordance with an embodiment of the present invention. In step 92, a determination is made as to whether or not a valid control signal is present within the IC. In step 94, a determination is made as to whether or not a valid power signal is also present. Steps 92 and 94 may be repeated continuously to determine the presence of a valid control signal and/or a valid power signal. In step 96, a default control signal is selected to configure the switching regulator when either valid configurable control signal or valid power signal is not present. Alternatively, when both the valid configurable control signal and valid power signal are present, the configurable control signal is utilized in step 98. The configurable control signal may be produced within the IC and may optimize the switching regulator for the particular application of the IC. The selected control signal is applied in Step 100 to configure the switching regulator. The switching regulator may electrically couple to an external power supply, such as a battery, and generate power signals from the external power supply that are used to power the components within the IC. Thus, FIG. 5 demonstrates that in transient operations a default configuration may be applied to the switching regulator.

In FIG. 6, the switching regulator is configured according to configurable settings that are determined within the IC. In step 102, the IC is at least partially powered. Partially powering the IC includes powering processing module(s) within the IC. These processing module(s), when properly powered, generate the configurable control signal in step 104. Because the processing module(s) are generating a valid configurable control signal and the switching regulator is generating a valid power output, the continuously monitored conditions of steps 92 and 94 are met. Thus, step 106 allows the selecting of the configurable control signal to be applied to the switching regulator because both a valid control signal and power signal are present. This illustrates that once the switching regulator has been configured in a first condition, such as when configured to a default mode of operation during an initial startup, that the switching regulator can be reconfigured as is done in step 108 based on the selecting a valid configurable control signal. This allows the operation of the switching regulator to be optimized during normal operation. Should either the presence of a valid power signal or a valid configurable control signal change, the switching regulator may be reconfigured according to the default control signal. This may occur should a power down signal be applied. Selecting the default control signal ensures that during a power down sequence, or startup sequence, as power is removed from various components within the IC, that the switching regulator is still able to provide a stable power signal output to the powered components within the IC.

FIG. 7 provides a logic flow diagram showing a power up sequence in accordance with an embodiment of the present invention. During this power sequence an IC is electrically coupled to an external power supply. More specifically, in step 122, a switching regulator is electrically coupled to an external power supply in order to produce the required voltages necessary to operate the various components within the IC. The switching regulator initially is configured according to a default control signal. This default control signal is stored in a default register available to the switching regulator. This allows the switching regulator to generate a stable, although not necessarily optimal, output power signal with which processing modules and other components within the IC may be properly powered up in step 126. Once the IC or components within the IC necessary to generate a proper control signal, has been powered up, a processing module within the IC may be used to generate a configurable control signal in step 128. This configurable control signal is then applied to the switching regulator. This allows the switching regulator to be reconfigured or optimized for normal operations in step 130. Reconfiguring the switching regulator in step 130 may require both the presence of a valid configurable control signal in the processing module and a valid power signal as provided in step 126. Additionally, to increase the flexibility of the various components within the IC, the configurable control signal may be supplied to a level shifter such that the configurable control signal may be reduced or boosted to an appropriate voltage level as required by the switching regulator. A number of switching regulators may actually be present within the IC in order to boost or reduce the input voltage and supply appropriate voltage levels for the various components within the IC.

In summary, embodiments of the present invention may provide a switching regulator which may be located within an IC. The switching regulator couples to an external power supply, a plurality of configurable control registers, a plurality of default registers, and a multiplexer. The multiplexer is operable to select an input control signal from either the plurality of configurable control registers or the plurality of default control registers as the output control signal to the switching regulator. This default control signal, although not optimal, allows the switching regulator to be configured in a default condition during start up or power down operations and ensures that the switching regulator is operable to provide a stable, although not necessarily optimal, power output to the various components within the IC.

Embodiments of the present invention offer many advantages over currently available switching regulators that have been incorporated within ICs. Most importantly, these switching regulators, by using the default registers to configure the switching regulator during start up and power down operations, ensure a stable power output to the IC. Even if this output is not from the desired mode of operation. This addresses the problem where the switching regulator supplies power to the IC components which in turn provide the control signal to the switching regulator.

The level shifter allows the control signal to be generated at one voltage level and levels shifted to the voltage level required for proper operation of the switching regulator.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. An integrated circuit (IC), comprising:
    a switching regulator electrically coupled to an external power supply, wherein the switching regulator is operable to power internal modules within the IC;
    a multiplexer;
    a plurality of configurable control registers operable to provide a configurable control signal as an input to the multiplexer;
    a plurality of default control registers operable to provide a default control signal as an input to the multiplexer; and
    the multiplexer operable to provide an output signal to the switching regulator, wherein the output signal is selected from the configurable control signal and the default control signal based upon a control enable signal received from a processing module, and wherein the output signal is operable to configure the switching regulator.

2. The IC of claim 1, wherein the default control signal is selected to be the output signal when the control enable signal is not present.

3. The IC of claim 1, further comprising a level shifter operable to level shift control signals of the configurable control registers from a first voltage level to a second voltage level.

4. The IC of claim 1, wherein the configurable control signal is selected to be the output signal when the control enable signal is present.

5. The IC of claim 1, further comprising a processing module operable to produce the control enable signal.

6. The IC of claim 1, wherein the switching regulator is initially configured by the default control signal during a power up sequence.

7. The IC of claim 1, wherein the switching regulator is configured by the default control signal when a power down signal is applied to the multiplexer.

8. An integrated circuit (IC), comprising;
    a switching regulator electrically coupled to an external power supply, wherein the switching regulator is operable to power a processing module within the IC;
    a multiplexer;
    a plurality of configurable control registers operable to provide a configurable control signal to the multiplexer;
    a plurality of default control registers operable to provide a default control signal to the multiplexer;
    a level shifter operable to level shift the configurable control signal of the plurality of configurable control registers and the default control signal of the plurality of default control registers from a first voltage level to a second voltage level; and
    the multiplexer operable to provide an output signal to the switching regulator, wherein:
        the output signal is selected from the level shifted configurable control signal and the level shifted default control signal, and wherein the output signal is operable to configure the switching regulator;
        the default control signal is selected to be the output signal when a valid control enable signal is not received from a coupled processing module; and
        the configurable control signal is selected to be the output signal when a valid control enable signal is received from the coupled processing module.

9. The IC of claim 8, further comprising a processing module that is operable to produce the configurable control signal.

10. The IC of claim 8, wherein the switching regulator is a boost switching regulator.

11. The IC of claim 8, wherein the switching regulator is a buck switching regulator.

* * * * *